United States Patent
Baras et al.

(10) Patent No.: US 8,681,957 B2
(45) Date of Patent: Mar. 25, 2014

(54) EXTRACTING SOCIAL RELATIONS FROM CALLING TIME DATA

(75) Inventors: Dorit Baras, Haifa (IL); Amir Ronen, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/468,041

(22) Filed: May 10, 2012

(65) Prior Publication Data
US 2013/0301823 A1   Nov. 14, 2013

(51) Int. Cl.
H04M 15/00   (2006.01)
(52) U.S. Cl.
USPC ................... 379/133; 373/134; 373/112.01
(58) Field of Classification Search
USPC ................ 379/133, 134, 137, 139, 112.01; 705/7.28
See application file for complete search history.

(56) References Cited

U.S. PATENT DOCUMENTS

| | | | |
|---|---|---|---|
| 7,941,388 B2 | 5/2011 | Alperin | |
| 2003/0185363 A1* | 10/2003 | Cerami et al. | 379/126 |
| 2008/0123829 A1* | 5/2008 | Smith et al. | 379/142.17 |
| 2008/0214148 A1 | 9/2008 | Ramer et al. | |
| 2008/0215623 A1 | 9/2008 | Ramer et al. | |
| 2009/0147936 A1* | 6/2009 | Won et al. | 379/201.02 |
| 2010/0198917 A1 | 8/2010 | Petersen et al. | |
| 2010/0325207 A1* | 12/2010 | Churchill et al. | 709/204 |
| 2010/0332270 A1 | 12/2010 | Richter et al. | |
| 2011/0173051 A1 | 7/2011 | Dey et al. | |
| 2011/0179125 A1 | 7/2011 | Lee et al. | |
| 2011/0295649 A1 | 12/2011 | Fine et al. | |

FOREIGN PATENT DOCUMENTS

WO   2008100015   8/2008

OTHER PUBLICATIONS

Skype, "Skyep to Go Numbers", Skype.com. URL: http://www.skype.com/intl/en/features/allfeatures/skype-to-go-number/, Published Apr. 4, 2012.

Przemys Przemysław aw Kazienko, "Expansion of Telecommunication Social Networks", Cooperative Design, Visualization, and Engineering Lecture Notes in Computer Science, vol. 4674/2007,pp. 404-412, 2007.

Alvin Chin, "Finding Cohesive Subgroups and Relevant Members in the Nokia Friend View Mobile Social Network", International Conference on Computational Science and Engineering 2009, CSE '09, vol. 4, pp. 278-283, Aug. 29-31, 2009.

* cited by examiner

Primary Examiner — Oleg Asanbayev
(74) Attorney, Agent, or Firm — Ziv Glazberg

(57) ABSTRACT

A method, apparatus, and computer program product for generating a social network data structure, the method comprising: receiving a corpus comprising one or more communication indications for one or more customers, each communication indication indicating start time and end time of a communication of the customer; and generating a social network data structure indicating connections between customers based upon the start time and end time indications of communication indication comprised in the communication indications.

13 Claims, 2 Drawing Sheets

EXTRACTING SOCIAL RELATIONS FROM CALLING TIME DATA

TECHNICAL FIELD

The present disclosure relates to customer relations, and to extracting relations between customers based on available data, in particular.

BACKGROUND

Many service providers, such as telecommunication service providers in general, and mobile telecommunication service providers in particular, gather diverse statistical information about individual customers in order to predict the behavior, needs, requirements, or the like in order to increase the customer's business volume, promote customer loyalty, predict future churns, acquire new customers, take marketing actions, or any other business activity or application.

Currently, mobile telecommunication companies are capable of extracting invaluable social information about large fractions of the population by analyzing which numbers individuals are calling, and optionally the identity of the other person, calling time, date and duration, or other parameters.

In the near future this ability is likely to be severely damaged as the information of the called numbers may not be available. Among the reasons for that are the usage of voice over IP applications such as Skype®, intensive usage of mobile virtual network operators (MVNO), or the like. Such technologies may utilize the mobile infrastructure and the internet as a platform for transferring calls as well as more sophisticated services. However, the mobile carrier may not be exposed to the actual number a person using the service is calling. This lack of information may significantly weaken the mobile carrier's ability to analyze the social activity and behavior of its customers.

BRIEF SUMMARY OF THE INVENTION

One aspect of the disclosure relates to a computer-implemented method performed by a computerized device, comprising: receiving a corpus comprising one or more communication indications for one or more customers, each of the communication indications indicating start time and end time of a communication of a customer; and generating a social network data structure indicating connections between customers based upon the start time and end time indications of a communication indication comprised in communication indications.

Another aspect of the disclosure relates to an apparatus having a processing unit and a storage device, the apparatus comprising: a corpus receiving component for receiving a corpus comprising one or more communication indications for one or more customers, the each communication indication indicating start time and end time of a communication of a customer; and a social network generation component for generating a social network data structure indicating connections between customers, based upon the start time and end time indications of communication indication comprised in the communication indications.

Yet another aspect of the disclosure relates to a computer program product comprising: a non-transitory computer readable medium; a first program instruction for receiving a corpus comprising one or more communication indications for one or more customers, each communication indication indicating start time and end time of a communication of a customer; and a second program instruction for generating a social network data structure indicating connections between customers, based upon the start time and end time indications of a communication indication comprised in the communication indications, wherein said first and second program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
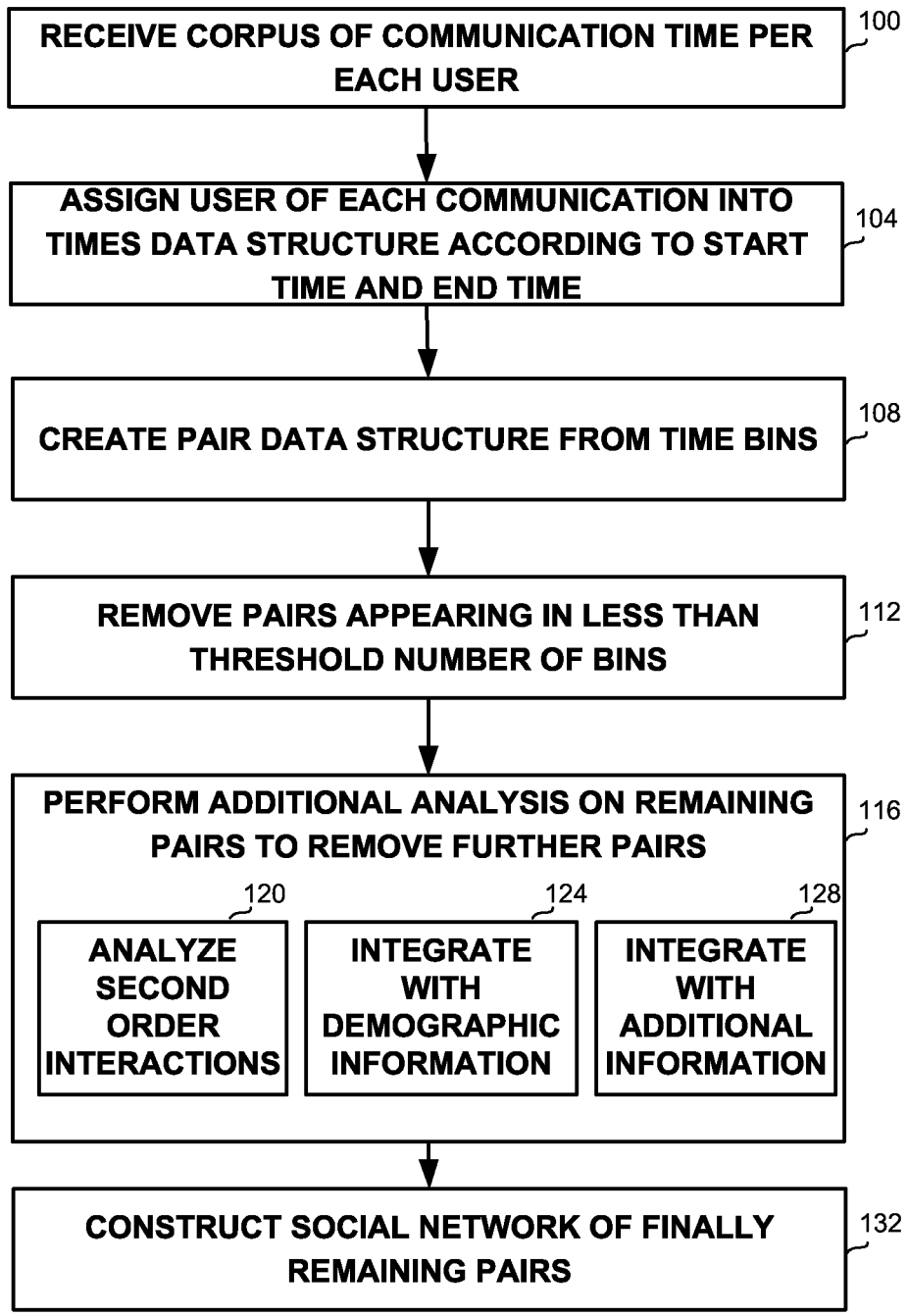
FIG. 1 is a flowchart of steps in a method for extracting social data from calling time data, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block or blocks of block diagrams.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is that due to the increased usage of voice over IP (VoIP) infrastructure and applications, mobile virtual network operators (MVNO) or the like, telecommunication providers lose an important source of information related to their customers, being information related to the calls the customers make to other people, whether the other people are also customers of the provider or not. Although the VoIP and MVNO operators may make use of the telecommunication infrastructure, the telecommunication providers do not have access to the actual numbers called.

For example, Skype® offers a "Skype To Go" service that operates as follows: suppose person A wants to call person B. Instead of a direct call, A provides B's number and Skype assigns a unique id number for B, which A can use. A can then dial an anonymous number made up of an access code to the service, followed by the unique id, or in some implementations only the unique ID, and pay lower rate than he or she would pay when calling B directly. If A and B are associated with the same telecommunication operator, then when A uses direct call, the carrier is able to see a Call Data Record (CDR) indicating the call from A to B. However, if A chooses the service described above, then the provider will only be able to see a CDR from A to the unique ID, and another CDR from an arbitrary number to B.

The telecommunication providers may attempt to obtain the called numbers from the companies that use the mobile platform to transfer calls. However this may not be feasible due to technical, business or legal issues, and may also incur high costs.

The lack of call information eliminates or weakens the ability of the telecommunication provider to analyze and figure out social networks between its customers. Such social networks are currently used by the providers to increase service consumption volume, improve customer loyalty, predict churn, or the like.

The telecommunication providers may also attempt to construct social network without the information related to relations between users as reflected by their calls, but apparently this data is an essential source of information.

One technical solution comprises the construction of a social network based upon the start and end times of calls made by customers, whether the calls were initiated or received by the customer. Since VoIP and MVNO applications at least partially use the mobile infrastructure, the conversation start and end time information may still be available to the telecommunication provider.

Social connection between customers may be deduced upon one or more calls made or received by the customers, wherein the calls may have the same start time and end time. All customers that conducted a conversation having the same start and end times, up to a predetermined resolution, are initially assumed to be pair-wise connected. For example, a data structure of a collection of bins may be created, wherein each particular bin may be associated with an ordered pair of start time and end time, such that all people that had a conversation that started at the start time and ended at the end time are assigned to that bin. Of course, a person (who generally conducted more than one call) will be assigned to multiple bins, in accordance with the number and times of the conversations he or she participated in. It will be appreciated that one or more of the bins may comprise additional information or characteristics, such as used service or the like.

However, since there may be more than one pair of people that communicated at the same times, having a multiplicity of such pairs of people also creates artificial connections between non-connected people. For example, if A communicated with B, and C communicated with D all at the same times, then A, B, C and D will be assigned to the same bin, such that all six pairs will be created (A-B, A-C, A-D, B-C, B-D, C-D), out of which only two (A-B and C-D) are correct.

It is thus required to sieve the created pairs so as to filter out artificial pairs which do not reflect real-world connection between the two sides.

The pairs may be sieved in accordance with the number of communications between the two people. For example if the same two people communicated at least a minimal number of times, e.g., they are found at the same minimal number of bins, it may be assumed that they are indeed connected. Other factors may take into account secondary network connections, e.g., mutual people they allegedly communicated with: for example if both A and B are connected to C, then A and B are statistically more likely to be connected. The pairs may further be crossed with other information, such as the accumulated communication duration; information available to the telecommunication operator related to direct calls between A and B; demographic information related for example to living or working areas, age, or any other parameters.

The resulting pairs may reflect real-world connection between the two persons. The confidence or certainty degree that a pair indeed reflects real-world connection may vary in accordance with the parameters used for sieving. For example, setting a higher threshold for the number of bins in which the two people are to be found together in order to be considered connected, may reduce the number of pairs on one hand but may leave only pairs for which the certainty degree is higher. It will be appreciated that trade-off exists between the required confidence degree and the recall degree. For example, setting a low threshold, such as requiring just one interaction between customers at the same time, may raise many false alarms, i.e., may provide pairs which are not connected, but will also provide high recall, i.e., almost no real-world connections will be missed, and vice versa. It will be appreciated that the method above can be further enhanced by statistically taking into account additional expected properties of the social network, such as degree distribution, social balance, etc. For example, a distribution of the number of connections per each person may be assumed: about 15% of the populations have fewer than 5 connections, about 20% have between 5 and 30 connections, about 30% have between 31 and 100 connection, etc. Such distribution may be constructed upon any available data, social studies, or the like. If the resulting network significantly deviates from the assumed distribution, it may be assumed that the method should be enhanced, for example raising or lowering thresholds. Etc.

One technical effect of the disclosed subject matter relates to the generation of social network of customers based on their communication times, without direct information about inter-communications. Thus, based on analyzing the start and end times of communications of a multiplicity of users, actual connections between pairs of users are identified.

The created network enables a telecommunication provider to predict churns, identify leaders, e.g. users whose churning may cause multiple other people to churn the provider, carry out marketing activities, or the like.

Referring now to FIG. 1, showing a flowchart of steps in a method for extracting social data from calling time data.

On step 100, a corpus of data may be received, which may contain for one or more users, each identified for example by a telephone number, an ID or any other identifier, at least the start time and stop time for one or more communications the user held, whether it was an incoming or outgoing communication. The data for each user may also comprise additional items such as details regarding the communication, demographic details, call history details, or the like.

On step 104, the corpus may be arranged in a data structure, for example a collection of time bins. A bin may be created for each pair of start-time and stop-time. Thus, multiple bins may be created with the same start time and different stop times, or vice versa. When the user data indicates that the user has participated in a communication starting a particular start time and ending at a particular stop time, if a bin already exists for these times, the user is added to this bin, otherwise a new bin may be created and the user is added to the new bin. It will be appreciated that the bins may be created with predetermined resolution. For example, different times within a few seconds from each other may be considered as the same time. Thus, if a user that has communicated between 02:00:00 and 02:10:00, and a bin exists with start time 02:00:00 and stop time 02:10:02, the user may be added to this bin. If exact match in the start or end times is required, the resolution may be set to zero. It will be appreciated that the start time and end time can be set in any cycle and any resolution, for example seconds within an hour (enabling up to 3600×3600 bins), minutes within a day (enabling up to ((60*24)×(60*24) bins), absolute time and date with any required resolution, or the like. The cycle and resolution may also be associated with the size of the corpus. For larger corpus, higher resolution and longer cycles may be required to avoid high percentage of false relations, and vice versa. In some embodiments, only communication from a predetermined time frame can be considered, e.g. only communications made during the last month.

On step 108, a pair collection may be created, wherein each pair is comprised of two customers appearing within the same time bin, and a counter. The pairs may be created by traversing all combinations of two customers appearing in the same time bin. If a new combination of two customers is encountered, a new pair is created, otherwise the counter of the relevant pair is increased.

In some exemplary embodiments, the pair counter can be enhanced to represent pair weight, such that the appearance of a pair within different bins can contribute different weights. For example, appearance in bins associated with longer time intervals may contribute higher weight, based on an assumption that the probability of two unconnected people to conduct at the same time a communication of fifty minutes is probably lower than the probability of the two people to conduct a communication of two minutes.

On step 112, pairs whose counter or weight is below a predetermined threshold may be removed. For example, if a pair of customers spoke at the same times (start time and stop times) less than three times over a predetermined period of time, it may be assumed that it is a coincidence and that the probability that they talked with each other at these times is low enough to be ignored. On the other hand, if a pair of customers spoke at the same times (start time and stop times) over ten times, it may be assumed that it is not a coincidence and that the probability that they talked with each other at least some of these times is high enough to be considered. It will be appreciated that the numbers above are exemplary only. It will be appreciated that setting a higher threshold may cause more pairs to be removed thus lowering the recall rate, but leaving only pairs of higher confidence.

The resulting pairs describe a social network, which may be described using any required format or data structure such as graph, table, database, or the like.

It will be appreciated that step 104, 108 and 112 represent an exemplary algorithm using exemplary data structures, and different algorithms for utilizing the start and end times (or start time and duration, or end time and duration) of communications may be used for generating a social network between customers.

On step 116, further analysis may be performed in order to remove additional pairs of customers, between which the likelihood of real-world connection is lower. It will be appreciated that the analyses detailed below are optional, and that any of them can be omitted or changed, and that additional analyses can be applied, in accordance for example with available data, available computing resources, or the like.

On step 120 second order interactions may be analyzed. For example, it may be determined that in order to deduce that A indeed has real-world connection with B, it is not enough that A and B had at least a predetermined interactions at the same times, but that there should be at least one or more other customers, such as C, D, or the like with whom both A and B communicated. There may be cases in which C or D are not customers of the same telecommunication provider, in which case such information may not be available.

On step 124, the created pairs may be crossed with demographic data, such as locality of A and B, age groups, or any other data which may be similar or hint at connection between A and B.

On step 128, the created pairs may be analyzed with any additional information, for example information retrieved from outside the network for example from computer social networks, previously known relations between customers, realized relations between customers based on direct communication using the telecommunication service provider, assumed or expected degree distribution, social balance, or the like.

Once it is determined which pairs are valid and likely to represent real-world connection between the customers, then on step 132 the resulting social network may be determined and represented in any required form, such as table, graph, text, database, or the like. The network may then be used for any business or commercial purpose including marketing, churn prediction, or the like.

Figure 2:
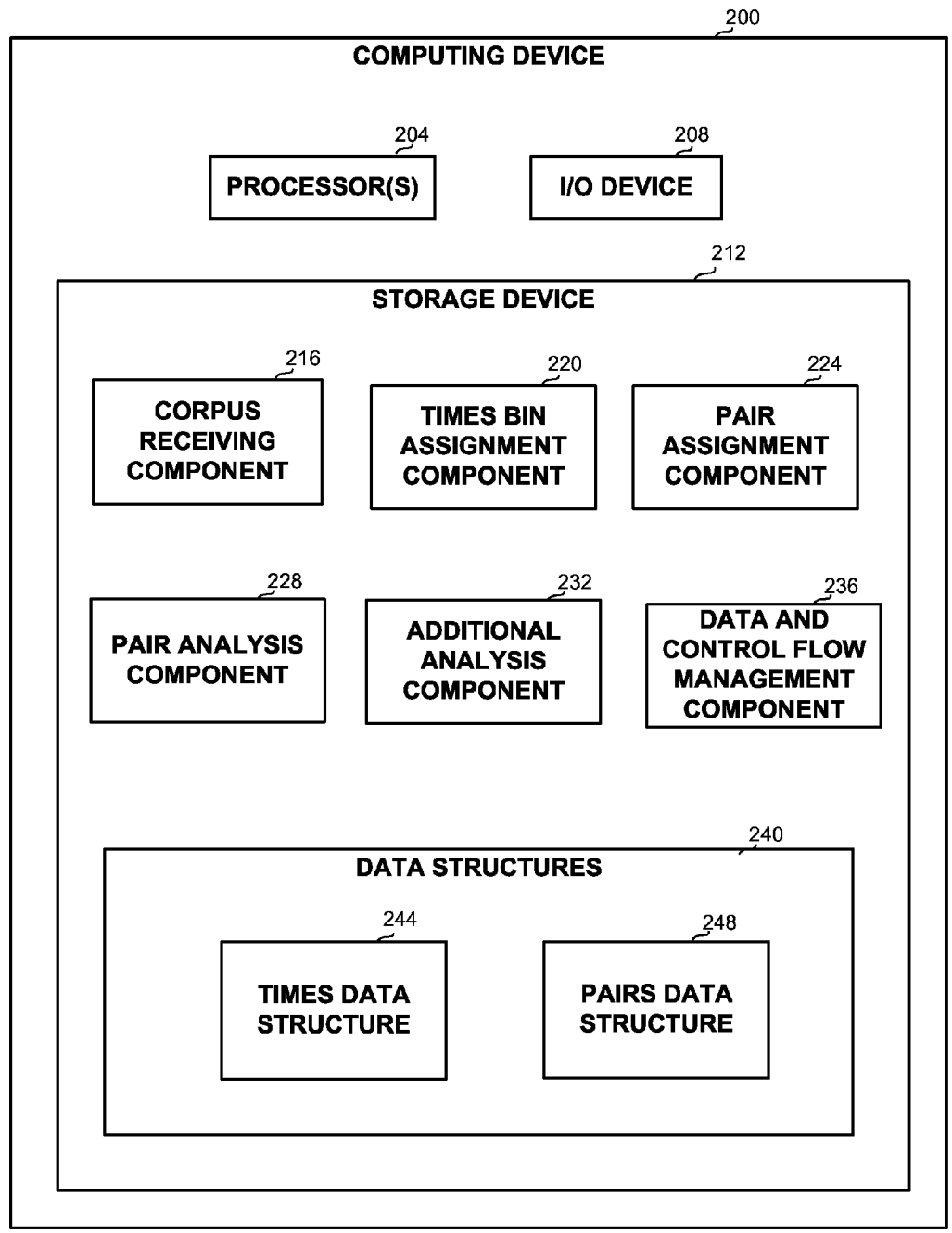
FIG. 2 shows a block diagram of components of an apparatus for extracting social data from calling time data, in accordance with some exemplary embodiments of the disclosed subject matter.

Referring now to FIG. 2, showing a block diagram of components of an apparatus for extracting social data from calling time data, in accordance with some exemplary embodiments of the disclosed subject matter.

The environment comprises a computing device 200, which may comprise one or more processors 204. Any of processors 204 may be a Central Processing Unit (CPU), a microprocessor, an electronic circuit, an Integrated Circuit (IC) or the like. Alternatively, computing device 200 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processors 204 may be utilized to perform computations required by computing device 200 or any of its subcomponents.

In some embodiments, computing device 200 may comprise an input-output (I/O) device 208 such as a terminal, a display, a keyboard, an input device or the like to interact with the system, to invoke the system and to receive results. It will however be appreciated that the system can operate without human operation and without I/O device 208.

Computing device 200 may comprise one or more storage devices 212 for storing executable components, and which may also contain data during execution of one or more components. Storage device 212 may be persistent or volatile. For example, storage device 212 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 212 may retain program code operative to cause any of processors 204 to perform acts associated with any of the steps shown in FIG. 1 above, for example determining configurations, setting a configuration, executing the tested program, or the like.

The components detailed below, optionally excluding data structures 240, may be implemented as one or more sets of interrelated computer instructions, loaded to storage device 212 and executed for example by any of processors 204 or by another processor. The components may be arranged as one or more executable files, dynamic libraries, static libraries, methods, functions, services, or the like, programmed in any programming language and under any computing environment.

Storage device 212 may comprise data structures 240, which may contain times data structure 244 and pairs data structure 248.

Times data structure 244 may comprise a collection of bins, each bin associated with a start time and end time, or a start time and duration, or duration and end time, or the like. Each bin may comprise an identifier of one or more customers that held communications starting at the start time and ending at the end time. It will be appreciate that the start time, end time, or duration may relate to a range of times, such as a few seconds. It will also be appreciated that each bin may represent the start and end time within an hour, a day, a month or any other time period, or represent absolute times.

Pairs data structure 248 may comprise a collection of one or more pairs, each pair associated with two customers who communicated at the same time at least once, and optionally a counter or a weight, indicating the number or another characteristics of the interactions which the two customers held at the same times.

In some embodiments the components loaded to storage device 212 may include corpus receiving component 216 for receiving a corpus detailing for one or more customers the start and end times of one or more communications. The corpus can contain more data, including for example information related to direct communication between customers, demographic data or the like. The corpus can be received via computer communication using any communication protocol, by sharing a database, via a portable storage device, or the like.

The components loaded to storage device 212 can also comprise times bin assigning component 220 for maintaining and populating times data structure 244 based upon the received corpus. For example, times bin assigning component 220 can be adapted to receive a record from the corpus, and examine each communication between a start time and end time: if a bin associated with these times exists, the customer ID is added to the bin, otherwise a new bin is created and the customer ID is added to the bin.

Another component may be pair assignment component 224 for receiving times data structure 244, and maintaining and populating pairs data structure 248. For any combination of two customers from times data structure 244, a pair indicating the two customers and a counter or weight indicator is created, or the counter or weight indicator is updated if the pair already existed.

Yet another component which may be loaded to storage device 212 is pairs analysis component 228, adapted to review pairs data structure 248 and filter out pairs that are unlikely to represent real-world connection between the two customers, for example pairs in which the value of the counter or weight indicator is below a threshold.

It will be appreciated that times bin assignment component 220, pair assignment component 224, and pair analysis component 228, comprise a social network generation component for generating a social network based on communication times of participants, and that the specific implementation, as well as data structures 240 are exemplary only. Other implementations and data structures may be used for generating a social network based on the start and end times of communications, without information related to direct communication between customers.

Another component may be additional analysis component 232 for performing additional analysis on pairs data structure 248, such as second order interaction analysis, using demographic indications related to the customers, enhancing the information with additional information received from other sources such as direct calls between customers, or the like.

Storage device 212 may also be loaded with data and control flow management component 236 for handling the assignment and analysis flow by activating the loaded components, tracking input and output, managing the control flow, or the like, for example in accordance with the method detailed in association with FIG. 1 above.

EXAMPLES

In an experimental environment, a corpus detailing communication times of 7000 individuals, with over 2000 relations, i.e., interactions, between pairs of individuals was received. A random start time within an hour (3600 options) and a random time interval of up to 360 seconds were assigned to each communication, and an end time was computed. In order to reconstruct the relations, only these start and end times were used, and the original data of the pair-wise communication was ignored.

The method described on association with FIG. 1 above was applied to the collection of start and end times. The results were that 570 of the real-world connections were retrieved, with precision of over 40%, i.e. over 40% of the discovered connections indeed represented real-world communications. Alternatively when using different parameters, about 400 relations were retrieved, with precision of over 50%.

Thus, the method can be applied to information available, for example, to telecommunication operators even when their customers use services such as the "Skype to go" described above, in order to retrieve connections between customers and reconstruct the social network.

The disclosed method and apparatus provide for reconstructing social network indicating connections between customers based upon calling times, without information related to direct communication between customers. The reprived relations may be enhanced with information available from other sources, such as demographic data, or data related to direct communications.

In some embodiments, usage of the method and apparatus may be limited to situations in which a customer of a telecommunication provider communicated with a number that is not known to be associated with another customer of the provider, thus saving resources.

The retrieved network may be used for promoting programs, targeted marketing attempts, predicting churns, or the like.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like, conventional procedural programming languages, such as the "C" programming language or similar programming languages, scripting languages such as Perl, Python, Ruby, or any other programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a computerized device, comprising:

receiving, at the computerized device, a corpus comprising at least two communication indications for at least two customers, the at least two communication indications indicating start time and end time of communications of the at least two customers, and lacking indication of a called number;

generating, at the computerized device, a social network data structure containing a connection between the at least two customers wherein the connection is estimated by matching the start time and the end time indications comprised in the at least two communication indications;

wherein the generating the social network data structure is done in absence of information related to direct communication between the at least two customers;

wherein the absence of information is due to the at least two customers calling an anonymous number;

wherein the generating the social network data structure comprises:

assigning the at least two communication indications into at least one times bin data structure comprising a multiplicity of bins, each bin associated with the start time and the end time indications;

generating at least one pair from the at least one times bin data structure, each of the at least one pair associated with a first customer and a second customer, and comprising a weight indication for communications of the first customer and the second customer; and removing the at least one pair subject to the weight indication being below a predetermined threshold; and wherein the weight indication is increased by one for each of the at least one bins in which the first customer and the second customer appear.

2. The computer-implemented method of claim 1, wherein the at least two communication indications comprises a communication start time and a communication end time, within a predetermined resolution.

3. The computer-implemented method of claim 1, wherein the at least two communication indications comprises a communication start time and a communication duration, within a predetermined resolution.

4. The computer-implemented method of claim 1, wherein the at least two communication indications comprises a communication duration and a communication end time, within a predetermined resolution.

5. The computer-implemented method of claim 1, further comprising performing additional analysis on the social network data structure.

6. The computer-implemented method of claim 5, wherein the additional analysis is selected from the group consisting of: secondary network connections; integration with demographic information related to the at least two customers; integration with communication information related to the at least two customers; expected properties of the social network data structure; and social balance.

7. An apparatus having a processing unit and a storage device, the apparatus comprising:
a corpus receiving component for receiving a corpus comprising at least two communication indications for at least two customers, the at least two communication indications indicating start time and end time of communications of the at least two customers, and lacking indication of a called number;
a social network generation component for generating a social network data structure containing a connection between the at least two customers, wherein the connection is estimated by matching the start time and the end time indications comprised in the at least two communication indications;
wherein generating the social network data structure is done in absence of information related to direct communication between the at least two customers;
wherein the absence of information is due to the at least two customers calling an anonymous number;
wherein the social network generation component comprises:
a times bin assignment component for assigning the at least two communication indications into at least one times bin data structure comprising a multiplicity of bins, each bin associated with the start time and the end time indications;
a pair assignment component for generating at least one pair from the at least one times bin data structure, each of the at least one pair associated with a first customer and a second customer, and comprising a weight indication for communications between the first customer and the second customer; and
a pair analysis component for removing the at least one pair subject to the weight indication being below a predetermined threshold; and wherein the weight indication is increased by one for each of the at least one bins in which the first customer and the second customer appear.

8. The apparatus of claim 7, wherein the at least two communication indications comprises a communication start time and a communication end time, within a predetermined resolution.

9. The apparatus of claim 7, wherein the at least two communication indications comprises a communication start time and a communication duration or a communication duration and a communication end time, within a predetermined resolution.

10. The apparatus of claim 7, further comprising an additional analysis component for performing additional analysis on the social network data structure.

11. The apparatus of claim 10, wherein the additional analysis is selected from the group consisting of: secondary network connections; integration with demographic information related to the at least two customers; integration with communication information related to the at least two customers; expected properties of the social network data structure; and social balance.

12. The apparatus of claim 7, further comprising a data and control flow management component for managing data and control flow within the apparatus.

13. A computer program product comprising:
a non-transitory computer readable medium;
wherein a first and a second program instructions are stored on said non-transitory computer readable medium and when executed by a processor perform:
said first program instruction receiving a corpus comprising at least two communication indications of at least two customers, the at least two communication indications indicating start time and end time of communications of the at least two customers, and lacking indication of a called number; and
said second program instruction generating a social network data structure containing a connection between the at least two customers, wherein the connection is estimated by matching the start time and the end time indications comprised in the at least two communication indications;
wherein generating the social network data structure, by said second program, is done in absence of information related to direct communication between the at least two customers;
wherein the absence of information is due to the at least two customers calling an anonymous number;
wherein generating the social network data structure, by said second program, comprises:
assigning the at least two communication indications into at least one times bin data structure comprising a multiplicity of bins, each bin associated with the start time and the end time indications;
generating at least one pair from the at least one times bin data structure, each of the at least one pair associated with a first customer and a second customer, and comprising a weight indication for communications of the first customer and the second customer; and
removing the at least one pair subject to the weight indication being below a predetermined threshold; and
wherein the weight indication is increased by one for each of the at least one bins in which the first customer and the second customer appear.

* * * * *